United States Patent [19]
Tochiori et al.

[11] Patent Number: 6,122,556
[45] Date of Patent: *Sep. 19, 2000

[54] OPERATING SYSTEM FOR FABRICATION APPARATUS

[75] Inventors: Satoshi Tochiori, Kawagoe; Iwao Kumasaka, Aiko-Gun; Hiroshi Shimatani, Nakakoma-Gun; Toshihiro Takashima, Kumamoto, all of Japan

[73] Assignee: Tokyo Electron Limited, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/603,591

[22] Filed: Feb. 16, 1996

[30] Foreign Application Priority Data

Feb. 20, 1995 [JP] Japan ................. 7-056534

[51] Int. Cl.⁷ .................................. G05B 11/01
[52] U.S. Cl. ............................ 700/17; 345/113
[58] Field of Search .................... 364/188, 189, 364/190, 146, 474.22–474.27, 468.15, 468.28, 191–193, 488–491; 345/145, 146, 157, 168, 119, 173, 965, 340, 117; 395/609, 965; 707/9

[56] References Cited

U.S. PATENT DOCUMENTS

| | | | |
|---|---|---|---|
| 4,679,137 | 7/1987 | Lane et al. | 364/188 |
| 5,014,210 | 5/1991 | Postlewait et al. | 364/188 X |
| 5,283,560 | 2/1994 | Bartlett | 345/352 |
| 5,297,252 | 3/1994 | Becker | 364/188 X |
| 5,319,353 | 6/1994 | Ohnishi et al. | 364/188 X |
| 5,345,389 | 9/1994 | Caluin et al. | 364/143 X |
| 5,548,304 | 8/1996 | Yoshino et al. | 345/119 X |
| 5,586,039 | 12/1996 | Hirsch et al. | 364/468.01 |
| 5,900,877 | 5/1999 | Weiss et al. | 345/340 X |

FOREIGN PATENT DOCUMENTS

| | | |
|---|---|---|
| 59-8027 | 1/1984 | Japan . |
| 3-105114 | 5/1991 | Japan . |
| 6-13278 | 1/1994 | Japan . |
| 7-320997 | 12/1995 | Japan . |

OTHER PUBLICATIONS

English Abstract for Japanese Patent Laid–Open Publication (KOKAI) No. 59–8027.
English Abstract for Japanese Patent Laid–Open Publication (KOKAI) No. 3–105114.
English Abstract for Japanese Patent Laid–Open Publication (KOKAI) No. 6–13278.
English Abstract of Japanese Patent Laid–Open Publication (KOKAI) No. 7–320997.

*Primary Examiner*—William Grant
*Assistant Examiner*—Chad Rapp
*Attorney, Agent, or Firm*—Smith, Gambrell & Russell, LLP

[57] ABSTRACT

By dividing a range within which a control device can be operated into a plurality of hierarchical operating levels corresponding to levels of different users of that control device, and inputting information such as the name and password of each of these users, the present invention makes it possible to set an operating level corresponding to each of these users. Once an operating level is set, an operating portion is configured to disable the operation of the control device in an operating range that exceeds this operating level. The configuration is such that switch portions of the operating panel are allocated to a certain operating level, but switch portions relating to operating levels other than the currently set operating level are disabled.

10 Claims, 6 Drawing Sheets

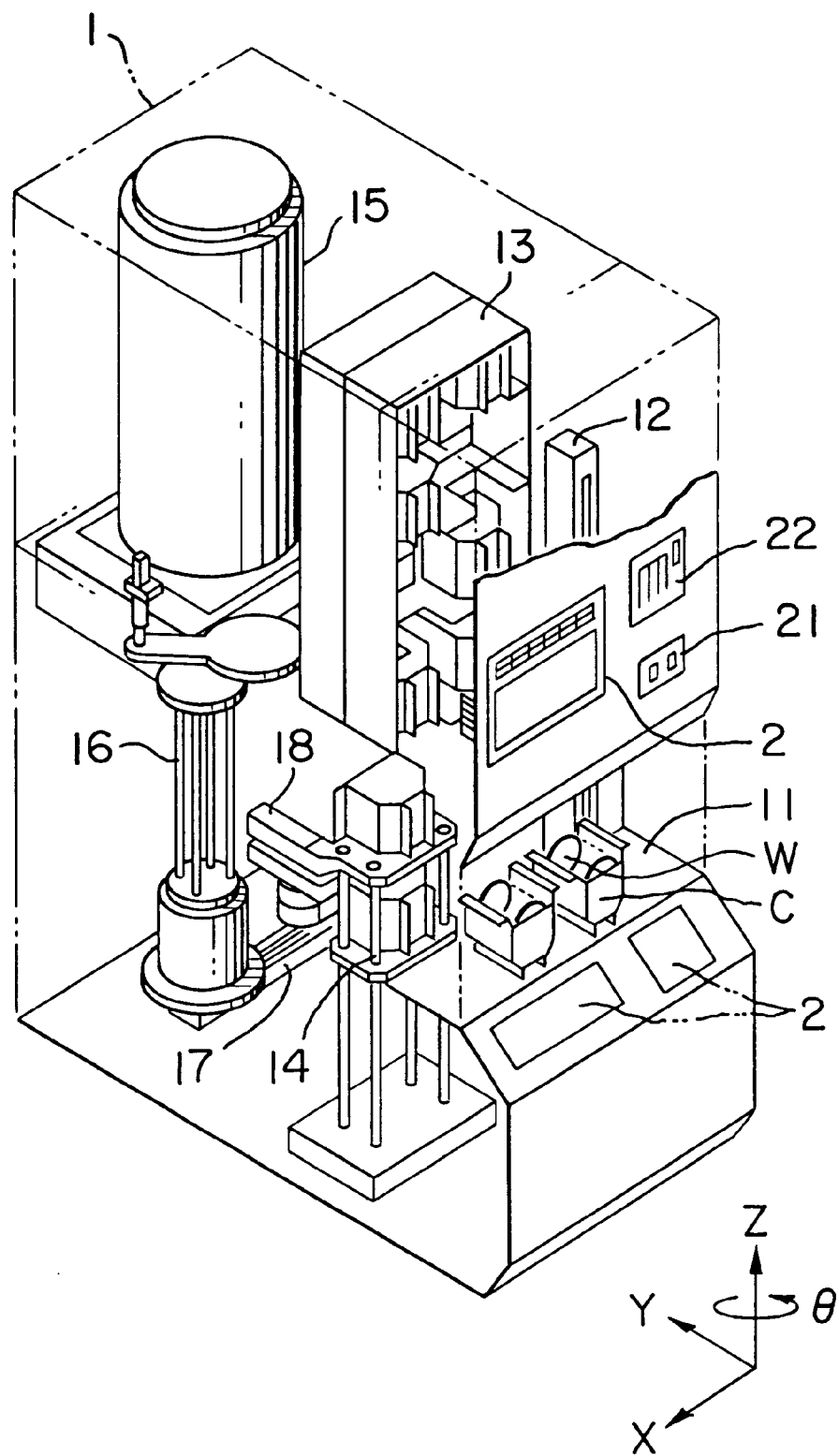
F I G. 1

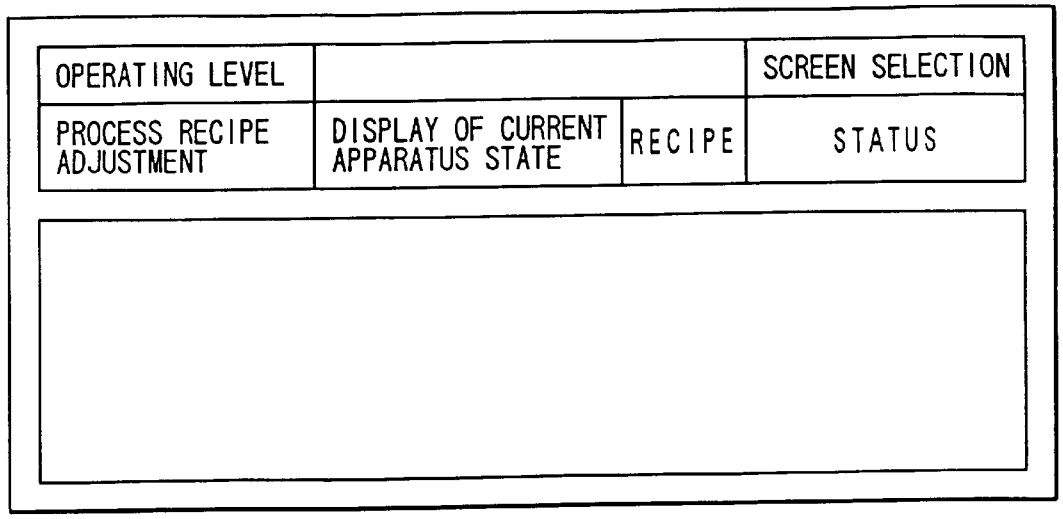
FIG. 3
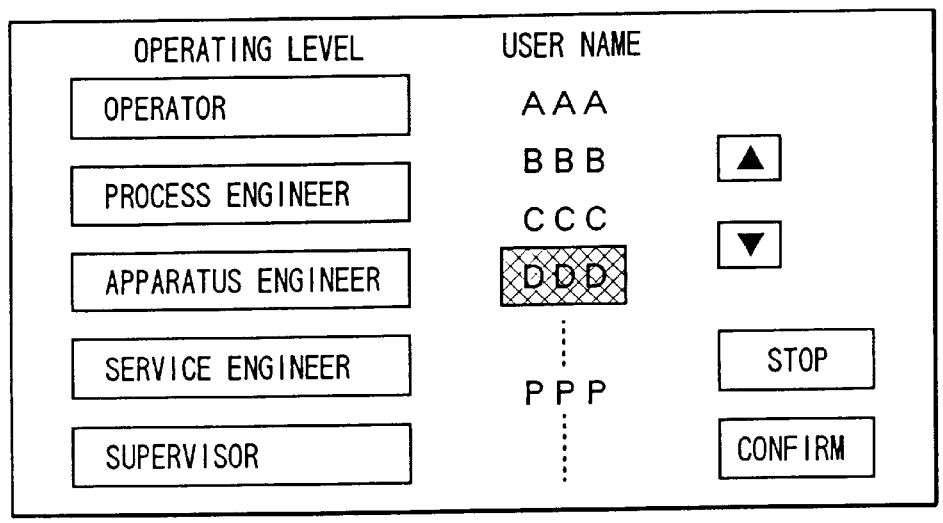
FIG. 4
| 7 | 8 | 9 | |
|---|---|---|---|
| 4 | 5 | 6 | |
| 1 | 2 | 3 | STOP |
| 0 | | | CONFIRM |
FIG. 5

OPERATING SYSTEM FOR FABRICATION APPARATUS

BACKGROUND OF THE INVENTION

The present invention relates to an operating system and operating method that enables the setting of operating levels in a control device for a fabrication apparatus such as a semiconductor fabrication apparatus or a liquid crystal display substrate fabrication apparatus.

In general, the operations of a control device for any of various types of fabrication apparatus are required to cover a wide range including simple operations based on a set sequence, manual operations for modifying or adjusting the control mode, and modification of the control program. In a batch-processing type of thermal treatment apparatus, which is one of the devices used in the fabrication of semiconductor devices, the operations include normal running, an on/off operation for halting the apparatus, modification of the process conditions such as gas flow rate and pressure, manual manipulation of the semiconductor wafer conveyor system, and modification of the method used to transfer data to a supervisory computer.

To enable these operations in the prior art, a front surface of the thermal processing apparatus (in this example) is provided with a touch panel that comprises areas corresponding to switch portions and a numeric keypad that are controlled by software, or switch portions that are physical hardware components. With such a touch panel, for example, the configuration is such that a subsequent screen is displayed when a switch portion on the screen is pressed. The user sees either the switch portions on the touch panel or the physical switch panel and activates various operations such as modifications by selecting a switch portion corresponding to each operation to be performed.

The turning on and off of the apparatus and emergency stop can be performed by an ordinary operator, but operations in addition to that range of operations set for the operator, such as setting the running conditions and performing running maintenance, are performed by an apparatus (process) engineer. In addition to the range of operations set for such engineers, there are more detailed operations such as functional settings and maintenance that are performed by a service engineer. Thus the operating levels are divided into several hierarchical steps. There is also password input and simple two-state switching between "yes" and "no" choices, performed by pressing keys.

However, in a conventional control device for a fabrication apparatus, such as a semiconductor fabrication apparatus, all of the normal operating functions are available to users and moreover the device can be operated by an unspecified number of users. Thus there is a danger that a certain user could mistakenly exceed the range of operations set originally for a user of that level. If that should happen, the smooth running of the apparatus could be impeded or, depending on the seriousness of the error, the apparatus could break down. If, for example, an ordinary operator who has no knowledge of the operating process were to perform an operation concerning the modification of the process conditions by mistake, the process conditions could be disturbed and thus the wafers will not be subjected to the predetermined thermal processing. As a result, the wafers might have to be destroyed or, if there is no suitable process engineer of a higher level close by to return the process conditions to their original settings, the operation will have to be halted.

Similarly, if an apparatus engineer should exceed the range of operations set for such engineers and perform a manual operation to revise teaching that had already been installed for the apparatus, the apparatus will have to wait for adjustment by a service engineer of an even higher level. Furthermore, if the control program or data should be damaged, the user of the apparatus will have to ask the manufacturer of the apparatus to send out a specialist called a supervisor. Such problems can be prevented beforehand by warning all the relevant users, but these warnings cannot be guaranteed to be remembered in the future and thus the fact is it is not possible to completely prevent such problems.

SUMMARY OF THE INVENTION

The present invention was devised in the light of the above described problem with the conventional art. The main objective thereof is to provide an operating system and operating method for a control device that can be applied efficiently and stably to the operation of a control device for a fabrication apparatus.

To achieve this objective, the present invention provides a control device for a fabrication apparatus driven by the operation of a switch portion of an operating portion, wherein the operating system for a control device comprises:

an operating level memory portion for dividing a range within which the control device can be operated into a plurality of hierarchical operating levels corresponding to levels attained by different users, and for storing an operating level that is assigned to a certain user in association with user information corresponding to that user;

an input portion for inputting user information;

an operating level setting portion for setting an operating level on the basis of user information that is input to the input portion and information stored in the operating level memory portion;

a first memory portion for storing information that determines the enabled operating level for the user, for each of a plurality of switch portions of the operating portion;

a second memory portion for storing an operating level that has been set by the operating level setting portion; and a state setting portion for setting each of the plurality of switch portions to either an enabled state or a disabled state on the basis of information stored in the first memory portion and the second memory portion.

The present invention divides the range of operations of a fabrication apparatus, such as a semiconductor fabrication apparatus or a liquid crystal display (LCD) substrate fabrication apparatus, into a plurality of hierarchical operating levels, and sets one of those operating levels. Permissible operating levels are assigned to each of the switch portions beforehand so that, once an operating level has been set, only the switch portions corresponding to that operating level are enabled. Thus the user is unable to perform an operation that is outside the range of operations determined for that operating level. When the operating level is set for an ordinary operator, for example, the only switch portions that are enabled are those permitted for the range of operations performed by that operator.

The present invention also makes it possible to set operating levels corresponding to the levels of each user, by inputting user information such as the personnel category of the user, or, in addition, the name and password of that user. This makes it possible to prevent the erroneous input of an operating level that is not the operating level that was originally assigned to that particular user, and thus enables reliable setting of the operating level. In particular, the establishment of a password-input condition makes it possible to prevent a user with a low operating level from operating at a higher operating level.

BRIEF DESCRIPTION OF THE DRAWINGS

FIG. 1 is a partially cut-away perspective view of the entire structure of a vertical thermal processing apparatus to which the operating system of the present invention is applied;

FIG. 3 is an illustrative view of an initial screen of the operating panel used by this embodiment of the present invention;

FIG. 4 is an illustrative view of a screen used for setting the operating level, on the operating panel used by this embodiment of the present invention;

FIG. 5 is an illustrative view of a screen used for inputting a password, on the operating panel used by this embodiment of the present invention;

DETAILED DESCRIPTION OF THE PREFERRED EMBODIMENTS

Figure 2:
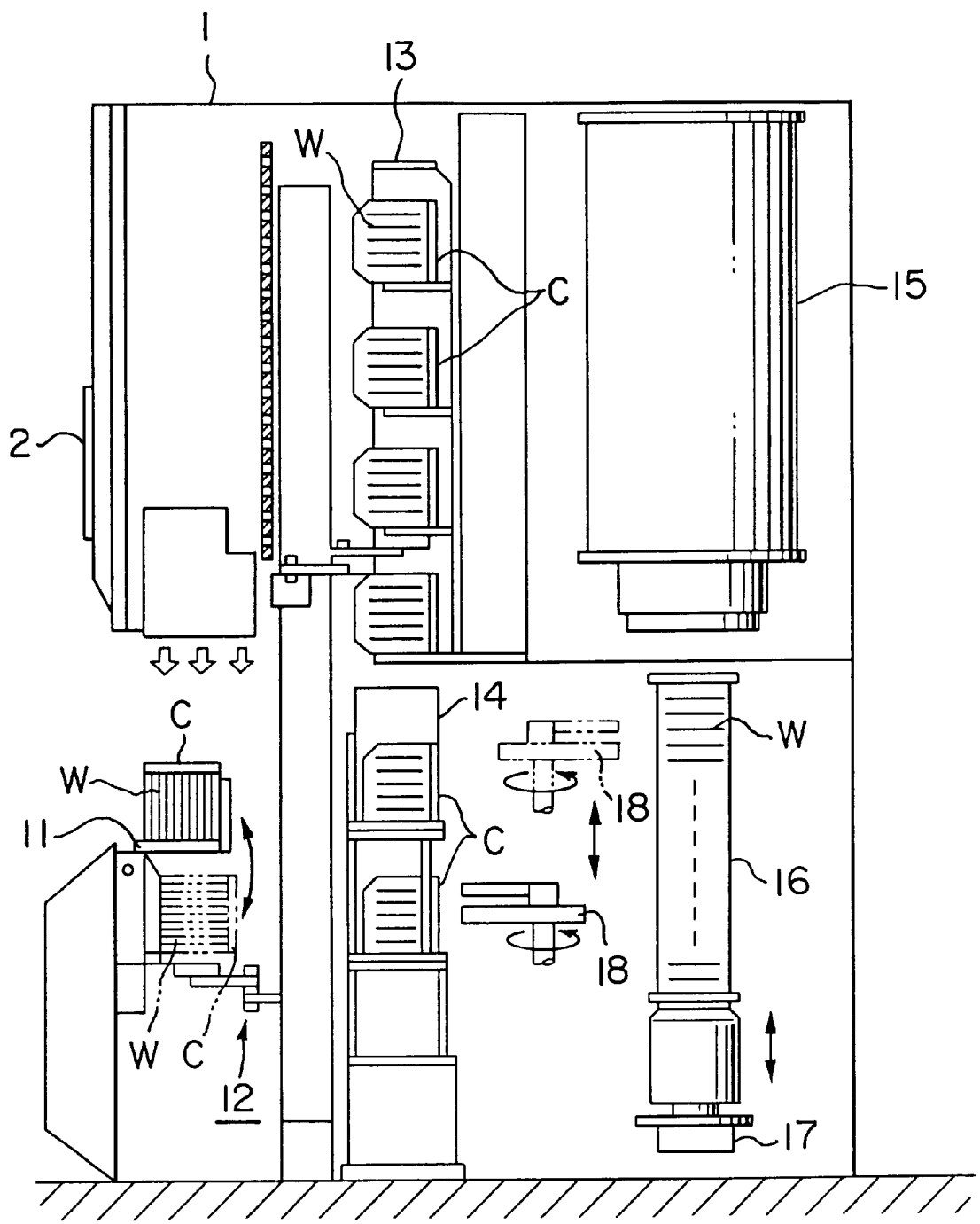
FIG. 2 is a side view of the entire structure of the vertical thermal processing apparatus shown in FIG. 1.

A preferred embodiment of an operating system in accordance with the present invention will be described below with reference to the application thereof to a vertical thermal processing apparatus. This embodiment is characterized in the portions thereof that control this type of apparatus, but the description will first of all relate to an applicable vertical thermal processing apparatus as shown in FIGS. 1 and 2. In these figures, reference number 1 denotes a casing. In addition to a conveyor portion 11 for conveying wafers that is formed on the front surface of the casing 1, this front surface is provided with an operating panel 2 consisting of a operating portion such as a touch panel for controlling the apparatus, as well as other components such as a switch panel 21 having switches and a gas piping display portion 22. In this case, the operating panel 2 can be disposed on a lower portion of the casing 1, as shown in FIG. 1.

A stocker 13 and an intermediate transfer stand 14 are disposed on a rear (furnace) side of the conveyor portion 11, with a cassette conveyor portion 12 therebetween. The configuration is such that cassettes C that contain wafers W are held on the conveyor portion 11 in such a manner that they can be rotated forward and backward through 90 degrees (as shown by the broken lines in FIG. 2). The cassettes C conveyed into the apparatus thereby are transferred by the cassette conveyor portion 12 directly onto the intermediate transfer stand 14.

A vertical type of thermal processing furnace 15 is disposed within the interior of the casing 1, and a boat elevator 17 for raising and lowering a wafer boat 16 is disposed on a lower side of the furnace 15. A conveyor arm 18 is provided between the boat elevator 17 and the intermediate transfer stand 14 for conveying wafers therebetween. Wafers W within a cassette C on the intermediate transfer stand 14 are conveyed either individually or in batches of several wafers by the conveyor arm 18 into the wafer boat 16. The wafer boat 16 is then raised and loaded into the thermal processing furnace 15 where the wafers W are subjected to a predetermined thermal processing.

The description now turns to the operating panel 2 used in the control device of this inventions as well as the types of control provided by this operating panel 2. The operating panel 2 is configured in such a manner that an action that is allocated to a switch portion is performed by pressing a region corresponding to that switch portion, which is displayed on a screen. This action is administered by software that is installed in the apparatus.

An example of the initial screen that is displayed on this operating panel 2 is shown in FIG. 3. A region delimited by a horizontal line at the top of this initial screen defines switch portions used by performing each of the operations displayed in this region. The switch portion labeled "Operating Level" causes the display of a screen for setting operating levels, which in this embodiment is used in common for an operating portion and an operation setting portion of the operating panel 2.

In this case, the range of possible operations within the vertical thermal processing apparatus is divided into a number of hierarchical stages, and an operating level is made to correspond to each of the thus divided stages. The operations of the thermal processing apparatus could be divided into five stages, for example. Operating levels at these five stages are specified as the levels for different categories of personnel who will operate this apparatus, such as operators, process engineers, apparatus engineers, service engineers, and supervisors, to correspond to the operating levels of each of these categories of personnel. In this embodiment, assuming that the operating level with the highest number has the greatest responsibility (has the widest range of operations), five operating levels 1, 2, 3, 4, and 5 are allocated to operators, process engineers, apparatus engineers, service engineers, and supervisors, respectively. In this case, operating level 5 could be kept secret for supervisors only, without informing the other users.

To set these operating levels, the "Operating Level" switch portion shown in FIG. 3 is pressed, and the subsequent operations are based on the screen displayed as shown in FIG. 4. In other words, if the "Confirm" switch is pressed after the personnel category (operating level) is selected and then a user name (personnel name) is selected with the cursor, operating level 1 is confirmed for the personnel category of Operator, and the display returns to the initial screen. However, if the "Process Engineer" or a higher level is selected, a numeric keypad is displayed as shown in FIG. 5. Using this numeric keypad, the user then inputs a predetermined personal (i.e., user-selected) designation such as a password and, if this password is correct (i.e., if it matches a previously stored password assigned to that user), the level is confirmed to be operating level 2. This enables a process called user registration. It should be noted that a password could equally well be assigned to the operator too, and the input of that password could be used as a condition. Alternatively, the use of passwords could be omitted.

In this embodiment of the present invention, the operating portion comprises the operating panel 2 and a control system that controls the screens displayed by this operating panel 2 and also outputs signals on the basis of the on/off state of switch portions thereof. This operating portion is configured in such a manner that, once an operating level has been set, it is not possible for a user to specify operations that are outside the range of operations corresponding to that operating level. In this embodiment, the limits of each range of operations (such as operating level 1) are set in such a manner that it is not possible to operate switches corresponding to an range of operations (such as operation level 2) that exceeds that range of operations. In other words, the arrangement is such that nothing happens if one of those switch portions is pressed.

In practice, the switch portions of the operating panel consist of an array of switch portions across the top of the initial screen and switch portions that are secondary screens such as "Recipe" or "Maintenance" that are displayed by selecting one of the top switch portions. However, to simplify the explanation of the configuration and action of this embodiment of the present invention, the description below will proceed on the assumption that these switch portions are represented by switch portions S1 to S10.

Figure 6:
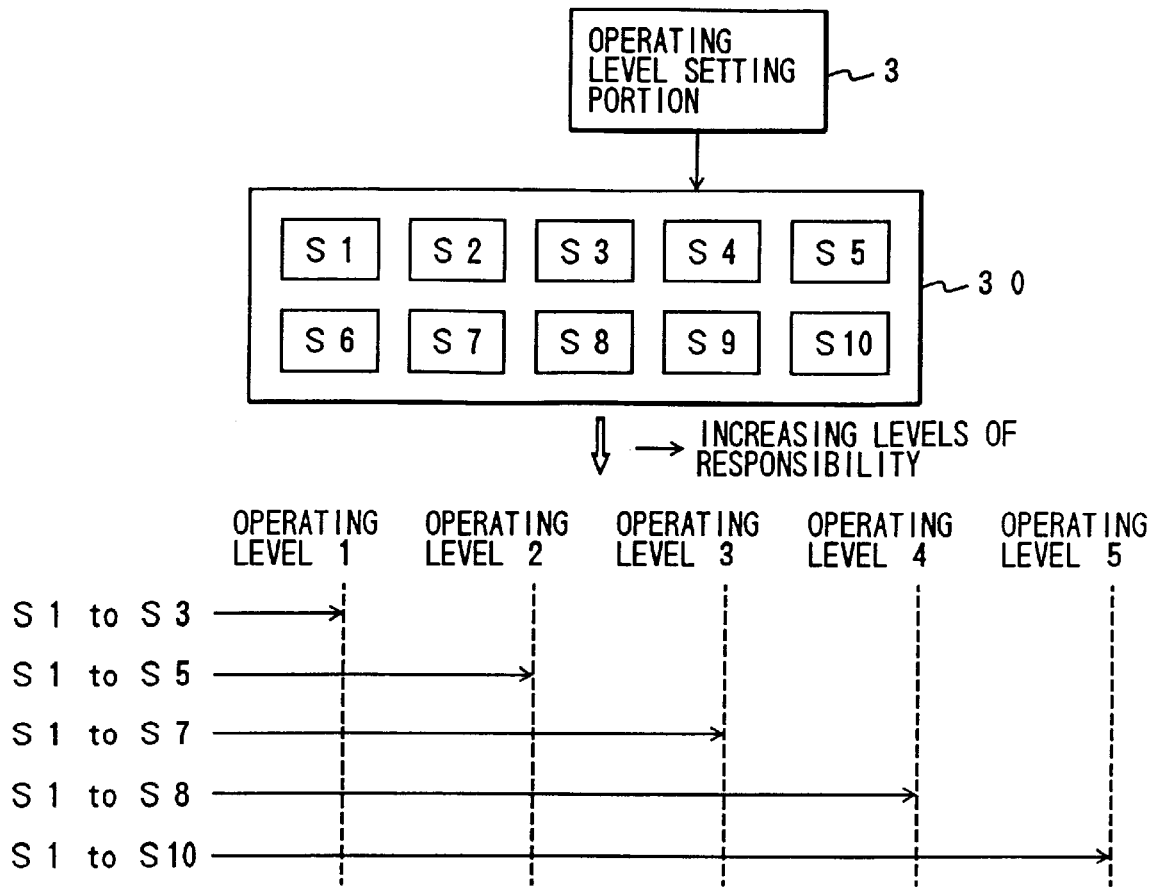
FIG. 6 is an illustrative view of the correspondence between operating levels and switch portions on the operating panel used by this embodiment of the present invention.

Switch portions S1 to S10 that are displayed on a screen 30 of the operating panel 2 are shown in FIG. 6 together with the correspondence between each of these switch portions S1 to S10 and the range of operations for each operating level. In this example, a range of possible operations enabled by switch portions S1 to S3 corresponds to operating level 1 and a range of possible operations enabled by switch portions S4 and S5 in addition to switch portions S1 to S3 corresponds to operating level 2. Therefore, the operating system is set up in such a manner that someone who is assigned to operating level 2 can operate switch portions S1 to S5, but someone assigned to operating level 1 cannot operate switch portions S4 and S5. From operating level 3 upward, a range of possible operations enabled by switch portions S1 to S7 corresponds to operating level 3, a range of possible operations enabled by switch portions S1 to S8 corresponds to operating level 4, and a range of possible operations enabled by switch portions S1 to S10 corresponds to operating level 5. In this case, operating level 5 is assigned to the developers of this system, so the existence of this level can be kept a secret, without the users of this apparatus being informed about it directly.

A simple example of the range of operations corresponding to each of the operating levels 1 to 5 is shown below (See FIG. 6).

| Operating Level | Personnel Category | Typical Operations |
|---|---|---|
| 1 | Operator | Basic operations (fabrication) |
| 2 | Process Engineer | + recipe operations |
| 3 | Apparatus Engineer | + maintenance |
| 4 | Service Engineer | + adjustment work |
| 5 | Supervisor | + OS/programming |

Figure 7:
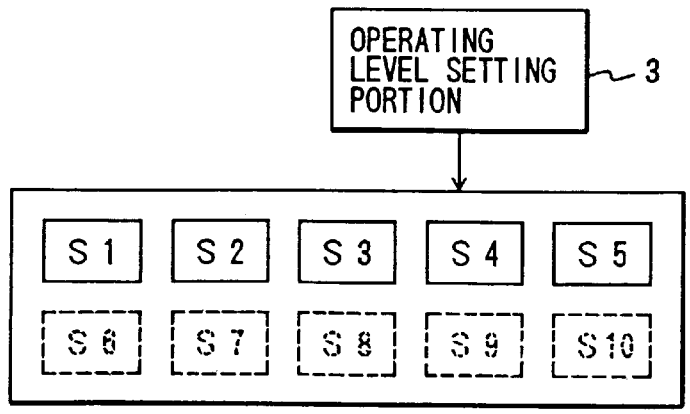
FIG. 7 is an illustrative view of switch portions that have bees enabled and switch portions that have been disable by the setting of an operating level in accordance with this embodiment of the invention.

Note that basic operations are selections from a screen that displays operation on/off, emergency stop, and operating state, which are the minimum operations necessary for everyday running of the apparatus. Recipe operations include the setting of processing conditions such as gas flow rates and pressure. Maintenance includes adjustment of components such as the boat elevator, heater, and conveyor system. Adjustment work is more detailed than maintenance, such as the initialization of the computer used in the conveyor system. OS/programming includes modification of the operating software and programs. The operating levels are set by an operating level setting portion 3. If, for example, operating level 2 is to be set, switch portions S6 to S10 that are outside the range of switch portions S1 to S5 which are assigned to operating level 2 are displayed in a state on the screen that indicates they cannot be used, such as semi-transparent, as shown in FIG. 7. Thus the range of operations is restricted.

The mechanical configuration for setting the above operating levels will now be described with reference to FIG. 8. Reference number 31 in this figure represents in an abbreviated form the screen used for setting operating levels on the operating panel 2, as previously described with reference to FIG. 4. Four memory portions are connected to a bus BS that is connected to the operating panel 2: a memory portion 41 for storing operating level setting data; another memory portion 42 for recording the set operating level, that is, the current operating level; a further memory portion 43 for recording information that specifies the operating levels to which the switch portions S1 to S10 belong; and a still further memory portion 44 for recording information that specifies which of the switch portions are enabled as a result of the setting of the operating level. These memory portions 41 to 44 are shown in an idealized form as being separate in FIG. 8, but each memory portion could equally well be a separate region within a single memory component.

Figure 8:
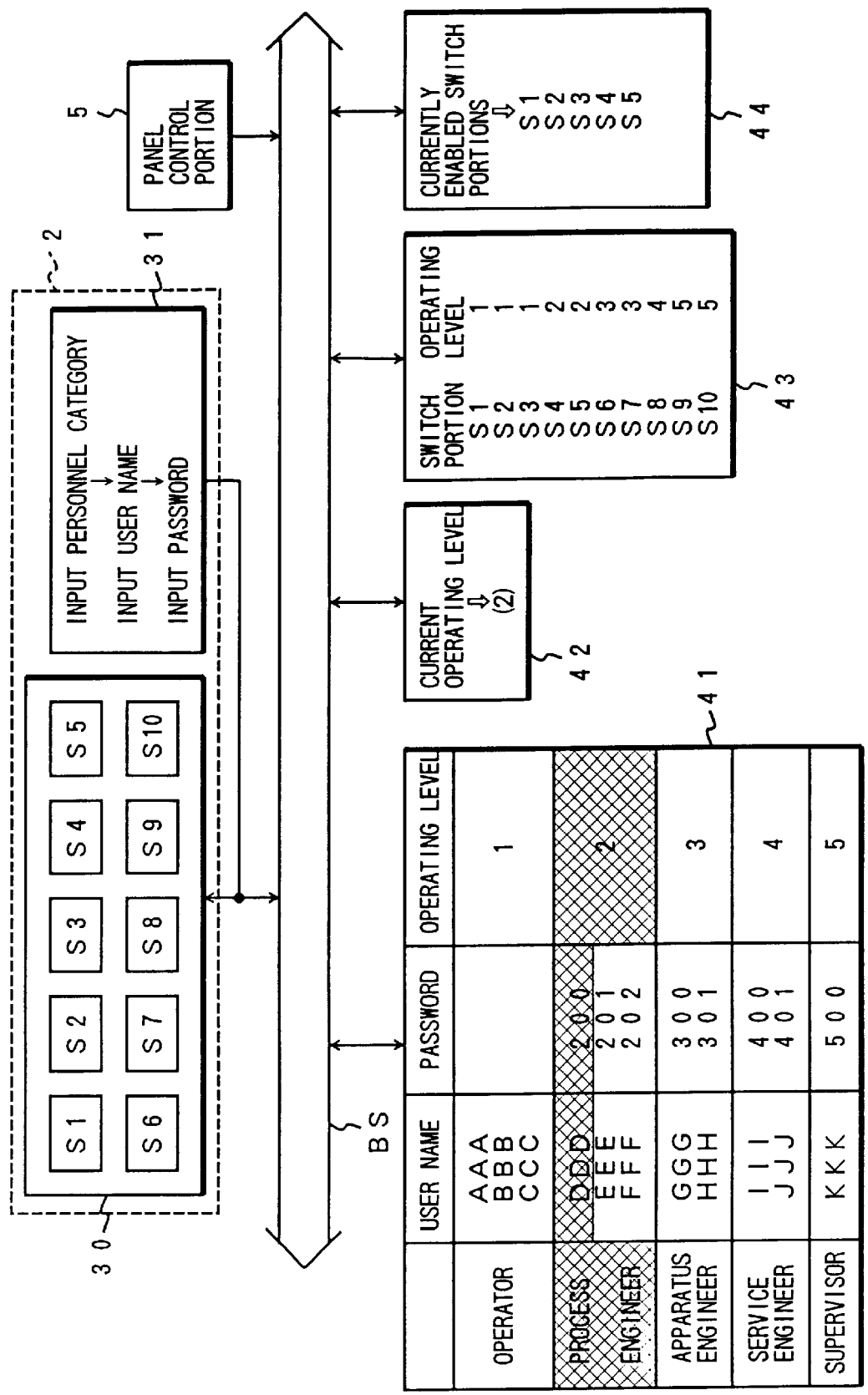
FIG. 8 is a structural diagram of the operating screen, the control system therefor, and an operating level setting portion that are main components of this embodiment of the preset invention.

The information written to the memory portion 41 of FIG. 8 is information relating personnel categories, user names (personnel names), passwords, and operating levels. In other words, this information defines which user (operator) belongs to which personnel category, what sort of password that user has, and which operating level the user corresponds to. Therefore, as described previously with reference to FIGS. 4 and 5, when a user first selects the personnel category to which he or she belongs from amongst the personnel categories such as operator or process engineer on the operating level setting screen, the user names (surnames) belonging to the selected personnel category are extracted, based on information in the memory portion 41, and displayed on the screen (displayed hatched on the screen). The password input screen is then displayed by selecting the appropriate user name from the displayed user names (but note that it is not necessary for an operator to input a password in this embodiment). If the input password matches the corresponding password in the memory portion 41, the operating level is set. The operating level that has been set in this manner is written to the memory portion 42.

The information in the memory portion 43 of FIG. 8 regulates the operating levels for the various ranges of operations of the switch portions S1 to S10. The number of each switch portion that is enabled in the operating level which has been set on the basis of the current operating level written to the memory portion 42 and the information in the memory portion 43 is written to the memory portion 44 by a panel control portion 5 connected to the bus BS. In the example shown in FIG. 8, the operating panel 2 is set and the switch portions S1 to S5 for that user (a process engineer) as written to the memory portion 44 as enabled switch portions.

The panel control portion 5 is configured of components such as a central processing portion and a memory containing a control program for the operating panel. Switch portions other than the switch portions that are enabled (in this example, S1 to S5) on the screen 30 are controlled by software on the basis of the information in the memory portion 44 in such a manner that they are in, for example, a semi-transparent or completely transparent state (the shaded portions in FIG. 7), and they do not turn on even if pressed.

In this embodiment, a state setting portion corresponds to the control portion of this invention, which controls the range of operations. This state setting portion sets whether the switch portions corresponding to a certain operating level are enabled or disabled after that operating level has been set, and is configured of the panel control portion 5 and the memory portions 43 and 44.

The above description was written on the idealized assumption that the switch portions are S1 to S10. However, in an actual operating panel for a fabrication apparatus, operating levels will be allocated to switch portions disposed in the upper portion of a screen as shown in FIG. 3, and also to switch portions that are enabled on screens that are called up by the pressing of these switch portions.

Figure 9:
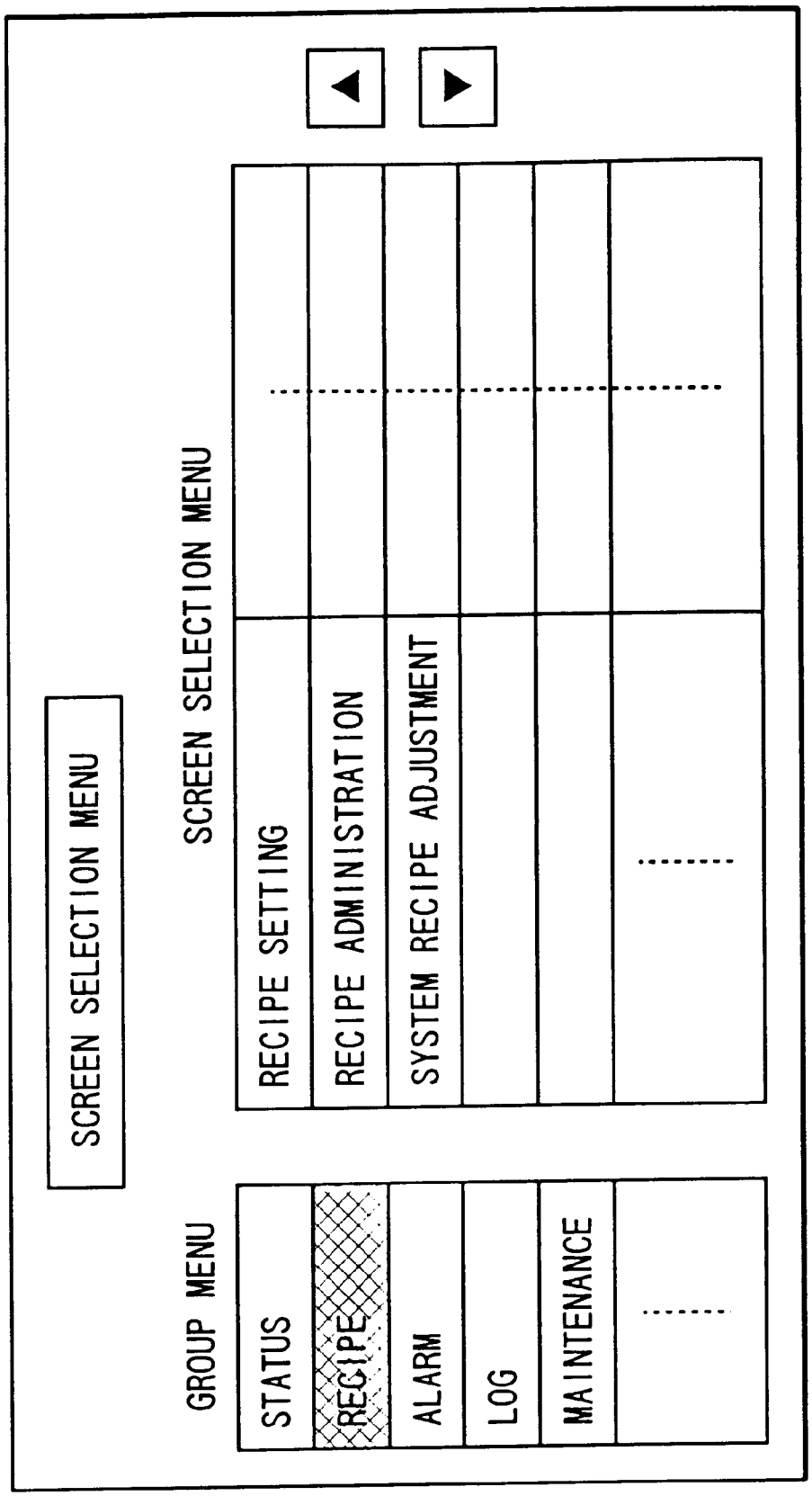
FIG. 9 is an illustrative view of an example of an operating screen in accordance with this embodiment of the present invention.

An example of the screen that will appear in the empty region of the initial screen of FIG. 3 after a predetermined operating level has been set is shown in FIG. 9. In this case, when the user presses one of the switch portions displayed on the left side of the screen as a group menu, such as "Recipe" (the shaded portion in the figure) or "Maintenance", the configuration is set up to display a further, more detailed screen. When the user then presses one of the switch portions such as "recipe setting" that is displayed as part of an operation menu on the right side of the screen, a screen showing that state, in this case the current recipe state, is displayed. In this manner, operating levels are allocated to the switch portions on the various screens, and each switch portion is in either a state in which it is enabled or a state in which it is disabled, depending on the current operating level, as was described with reference to FIG. 8.

Assume that switch portions such as the "Screen Selection" of FIG. 3 and the "Recipe" group menu of FIG. 9 are assigned to operating level 1 so that they can be used by operators, and the switch portion labelled "Maintenance" of FIG. 3 is assigned to operating level 2. If the "Maintenance" switch portion is pressed, a screen displaying switch portions such as "Board Elevator" and "Conveyor Arm" will appear. However, since different operating levels are assigned to these switch portions, users with low operating levels have a restricted maintenance range. Note that the group menu "Recipe" (the shaded portion) is selected in FIG. 9. It is also possible to press the "Log" switch portion to determine the history of parameter changes in the control device, or the history of processing results in the fabrication apparatus.

It should be noted, however, that the operations of the vertical thermal processing apparatus are not necessarily concentrated on this control panel. Switch portions that control actual operations and an on/off switch that halts the apparatus could be disposed as physical switches on a switch panel that is separate from the operating panel, and no operating level is allocated for the use of these hardware switches. In other words, the present invention could be interpreted as allocating all of the operations to ranges of operations in a hierarchical fashion, or it could equally well be interpreted as allocating operating levels to only part of the total range of operations, that is, those operations enabled from the control panel. It should be obvious to those skilled in the art that the present invention could be interpreted as allocating operating levels to physical switch portions, and using a physical method to disable those of the switch portions that correspond to operating levels higher than the currently set operating level.

The operation and effects of this embodiment of the operating system for a control device in accordance with this invention will now be described. An operator intending to run the operating system first presses the switch portion labelled "Operating Level" on the control panel shown in FIG. 3, to set operating level 1 on the basis of the screen shown in FIG. 6, as was described above. As a result, the operator is unable to operate the switch portions relating to ranges of operations that are allocated to operating level 2 and above. In this manner, the operator is prevented from mistakenly pressing switch portions such as "Recipe Adjustment" that concerns the setting of the recipe and "Maintenance" that is used for maintenance, which the operator is not permitted to perform, and thus there is no danger of the operator approaching a range of operations that is outside a range of operations that can be considered reserved for operators. Similar restrictions apply to other operating levels, to ensure that there is no danger of a process engineer, who is assigned to operating level 2, performing operations such as adjusting the conveyor system which exceeds the range of operations set for process engineers. In the same manner, users with operating levels 4 downward are unable to touch the control program.

In the embodiment described above, the range of operations of a vertical thermal processing apparatus is divided in a hierarchical manner into steps corresponding to categories of personnel (operating levels). Thus ranges of operations are restricted in such a fashion that users are allocated to operating levels corresponding to category in such a manner that each user can only perform operations within the range of that operating level. Therefore, there is no danger of a user performing an operation that is outside the specific range set for that user, and the range of operations is restricted by the system without any need to issue detailed warnings to users to not touch switch portions that are outside that range. Thus the stability, ease, and functionality of operations can be guaranteed, and the apparatus can be run in an efficient manner.

The operating system for a control device of a fabrication apparatus in accordance with the present invention is not limited to application to a vertical thermal processing apparatus; it can equally well be applied to a single-wafer thermal processing apparatus, an etching apparatus, an ashing apparatus, a sputtering apparatus, an ion implantation apparatus, a coating/developing apparatus, a washing apparatus, or an exposure apparatus. It can also be applied to an apparatus used for processing wafers or liquid crystal substrates, or to a prober. In addition to being applicable to a wide range of control devices such as plant control devices, machining apparatuses, power monitoring devices, waste water treatment plants, it can be applied to personal computers and mainframe computers.

Furthermore, the method of restricting a range of operations by setting operating levels is not limited to the setting an enabled or disabled state for each switch portion; any of the following methods can be used therefor:

(a). Ensuring that subsequent screens correspond to the current operating level (using a means called a "transient" buffer).

(b). Ensuring that part of the screen is masked.

(c). Ensuring that the cursor does not move to items that are outside the current operating level.

Note that these methods of restricting the operations of switch portions of the control device are not limited to restricting the operations of switch portion of a touch panel; they include methods such as (c) above by which it is not possible to select restricted items because the cursor will not move to them. In such a case, the display of items that can be selected by the cursor and an Execute key appear as such switch portions.

The division into operating levels is not limited to the method of the above described embodiment; the division could equally well be into two operating levels or six or more operating levels depending on the apparatus to which this invention is applied. Furthermore, the determination of operating level for each of the personnel categories is not limited to that described above with respect to this embodiment. The configuration could be such that the operating level is determined to correspond to a factor such as the type of operation, for example, and the person performing the operation decides which operating level to select. This configuration could be used for a personal computer, where the operations are divided into three levels: basic, intermediate, and advanced. If the person operating the computer then uses his or her own judgement to select an operating level, there is no danger of the system being damaged by an operation that the user does not understand.

Another method of setting operating levels could be such that the person performing the operations is allocated a floppy disk or memory card on which is written just an operating level or an operating level plus a program that operates at an operating level in addition to the simple operating level. The contents of this memory medium could be read out by the user to restrict the range or operations, or the operating level could be setting by use of a keyboard.

By setting an operating level and disabling operations that exceed a range of operations set for that operating level, the present invention makes it possible to limit the operations of an apparatus in a hierarchical fashion and thus prevent problems caused by erroneous operations or unpredictable operations. Since operating levels are assigned with respect to switch portions, this invention has the effect of enabling a simple way of restricting the range of operations that each user can perform.

The present invention makes it possible to set operating levels by inputting user information such as personnel categories or more detailed information such as user names and passwords. This makes it possible to prevent erroneous input of an operating level that is different from that originally allocated to a certain user. Since this ensures that operating levels can be set correctly, the previously described problems with the prior art can be prevented reliably.

What is claimed is:

1. A fabrication apparatus driven by the operation of a switch portion on an operating panel portion, wherein said fabrication apparatus is provided with an operating system comprising:

an operating level setting portion for dividing a range within which said fabrication apparatus can be operated into a plurality of hierarchical operating levels corresponding to levels attained by different users, and for setting an operating level as a parameter with respect to said operating panel portion;

a first memory portion for storing information that determines the enabled operating level for each of said users, for each of a plurality of switch portions on said operating panel portion;

a second memory portion for storing an operating level that has been set by said operating level setting portion; and a state setting portion for setting each of said plurality of switch portions to either an enabled state or a disabled state on the basis of information stored in said first memory portion and said second memory portion, said state setting portion causing switch portions in said disabled state to be in a completely transparent state.

2. The operating system of claim 1, wherein said fabrication apparatus is a semiconductor fabrication apparatus.

3. The operating system of claim 1, wherein said fabrication apparatus is a liquid crystal display substrate fabrication apparatus.

4. A control device driven by the operation of a switch portion on an operating portion, wherein said control device is provided with an operating system comprising:

an operating level memory portion for dividing a range within which said control device can be operated into a plurality of hierarchical operating levels corresponding to levels attained by different users, and for storing an operating level that is assigned to a certain user in association with user information corresponding to said user;

an input portion for inputting user information;

an operating level setting portion for setting an operating level on the basis of user information that is input to said input portion and information stored in said operating level memory portion; first memory portion for storing information that determines the enabled operating level for said user, for each of a plurality of switch portions of said operating portion;

a second memory portion for storing an operating level that has been set by said operating level setting portion; and a state setting portion for setting each of said plurality of switch portions to either an enabled state or a disabled state on the basis of information stored in said first memory portion and said second memory portion, said state setting portion causing switch portions in said disabled state to be in a completely transparent state.

5. The operating system of claim 4, wherein said user information comprises the category of said user.

6. The operating system of claim 4, wherein said user information comprises the name of said user.

7. The operating system of claim 4, wherein said user information comprises a password allocated to said user.

8. The operating system of claim 4, wherein said control device is used in a semiconductor fabrication apparatus.

9. The operating system of claim 4, wherein said control device is used in a liquid crystal display substrate fabrication apparatus.

10. A method of operating a control device, comprising the steps of:

dividing a range within which a control device can be operated into a plurality of hierarchical operating levels corresponding to levels attained by different users;

inputting user information corresponding to each user, which comprises a personnel category that determines the operating level that enables the operation of each of switch portions used for operations, and thus setting an operating level;

enabling only those of said switch portions that are permitted for the thus set operating level and disabling other switch portions; and placing said disabled switch portions in a completely transparent state.

* * * * *